United States Patent
Ito et al.

(10) Patent No.: US 7,946,195 B2
(45) Date of Patent: May 24, 2011

(54) STEERING APPARATUS FOR VEHICLE

(75) Inventors: Tadao Ito, Toyohashi (JP); Akira Osanai, Hamamatsu (JP); Kenji Higashi, Tenri (JP)

(73) Assignees: Fuji Kiko Co., Ltd., Kosai-shi, Shizuoka (JP); JTEKT Corporation, Osaka-shi, Osaka (JP)

( * ) Notice: Subject to any disclaimer, the term of this patent is extended or adjusted under 35 U.S.C. 154(b) by 647 days.

(21) Appl. No.: 11/989,005

(22) PCT Filed: Jul. 12, 2006

(86) PCT No.: PCT/JP2006/313841
§ 371 (c)(1),
(2), (4) Date: Jan. 18, 2008

(87) PCT Pub. No.: WO2007/010791
PCT Pub. Date: Jan. 25, 2007

(65) Prior Publication Data
US 2009/0152044 A1    Jun. 18, 2009

(30) Foreign Application Priority Data
Jul. 20, 2005    (JP) ................................. 2005-210591

(51) Int. Cl.
*F16H 37/00*    (2006.01)
(52) U.S. Cl. ............ 74/640; 180/402; 192/78; 192/84.8
(58) Field of Classification Search ......................... None
See application file for complete search history.

(56) References Cited

U.S. PATENT DOCUMENTS

| | | | |
|---|---|---|---|
| 2,395,576 A * | 2/1946 | Moroney | 192/43.1 |
| 6,012,347 A * | 1/2000 | Hasegawa | 74/388 PS |
| 6,913,107 B2 * | 7/2005 | Sato et al. | 180/402 |
| 2004/0258101 A1 * | 12/2004 | Lange | 370/508 |

FOREIGN PATENT DOCUMENTS

| | | |
|---|---|---|
| DE | 27 40 919 A1 | 3/1979 |
| EP | 1 479 936 A1 | 11/2004 |
| JP | 57-25524 A | 2/1982 |
| JP | 61-282632 A | 12/1986 |

(Continued)

OTHER PUBLICATIONS

Extended European Search Report issued Nov. 12, 2010, in counterpart European Application No. 06781011.9, eleven (11) pages.

*Primary Examiner* — David D Le
*Assistant Examiner* — Jacob S Scott
(74) *Attorney, Agent, or Firm* — The Nath Law Group; Jerald L. Meyer; Jonathan A. Kidney

(57) ABSTRACT

A steering apparatus for a vehicle capable of executing a steer-by-wire (SBW) mode of steering road wheels by a steering mechanism mechanically disconnected with a steering device. The steering apparatus includes a clutch which is composed of a shaft that rotates together with the steering device, an internal gear ring which has a rotation center coinciding with that of the shaft and transmits its rotation to the steering mechanism, an external gear ring partially intermeshed with the internal gear ring, lock members which transmit/disconnect the rotation of the shaft to the external gear, and a lock operating member for displacing the lock members to lock/unlock positions.

6 Claims, 13 Drawing Sheets

FOREIGN PATENT DOCUMENTS

| | | |
|---|---|---|
| JP | 3-277829 A | 12/1991 |
| JP | 6-22151 U | 3/1994 |
| JP | 2000-304073 A | 10/2000 |
| JP | 2004-237785 A | 8/2004 |
| JP | 2004-237786 A | 8/2004 |
| JP | 2004-351975 A | 12/2004 |
| JP | 2005-8073 A | 1/2005 |
| JP | 2005-132327 A | 5/2005 |

* cited by examiner

FIG. 8
(a)
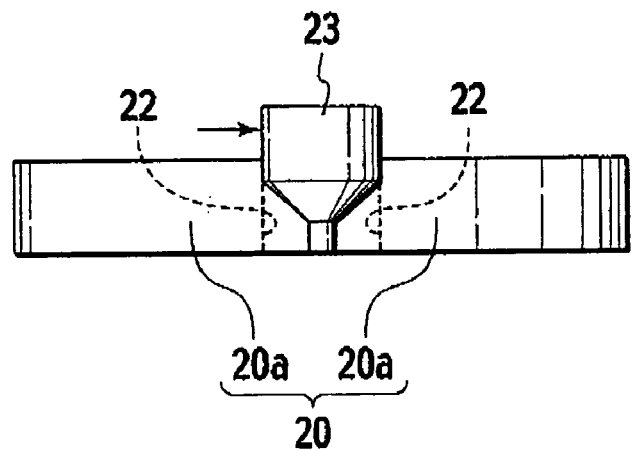
(b)
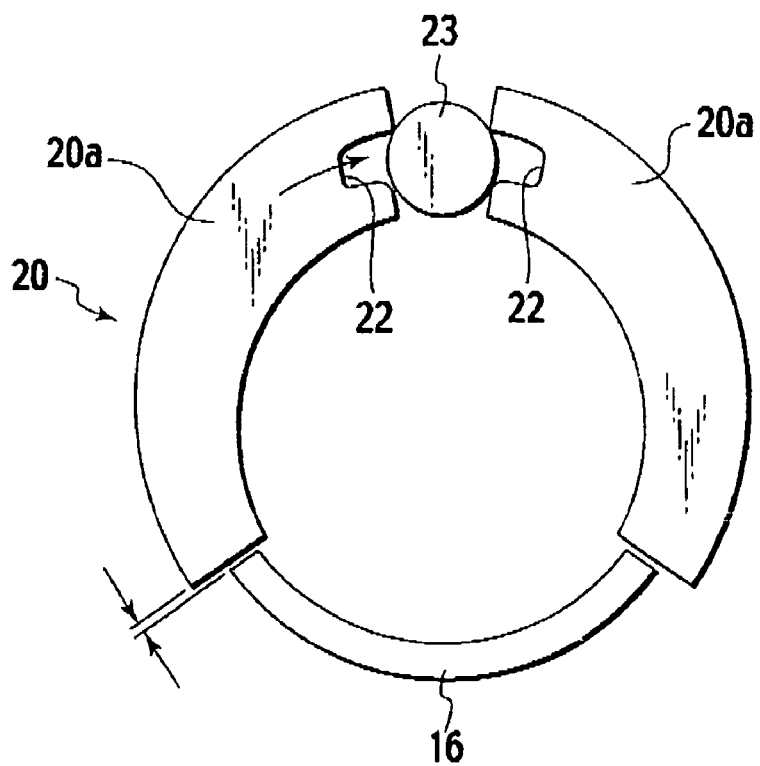

FIG. 10
(a)
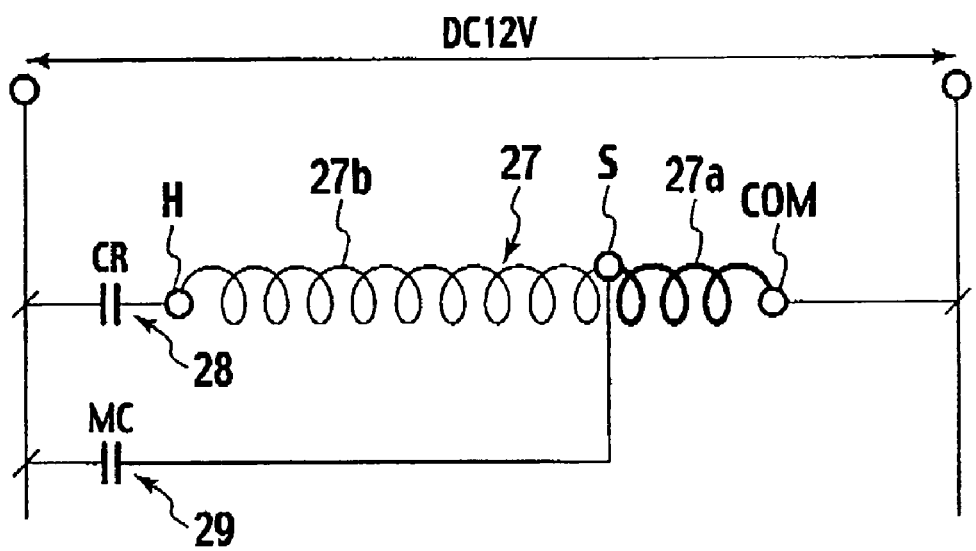
(b)
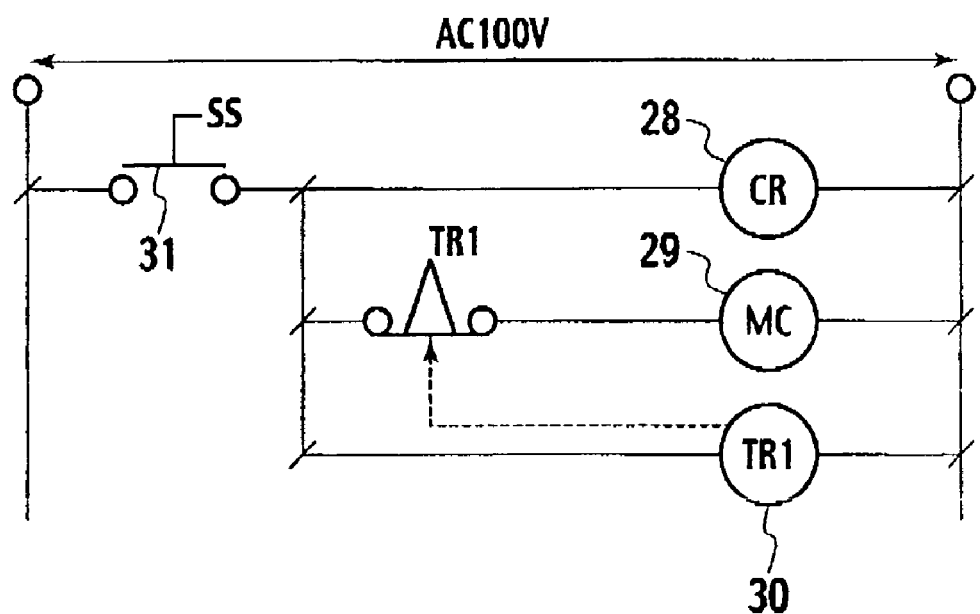

FIG. 12
(a)
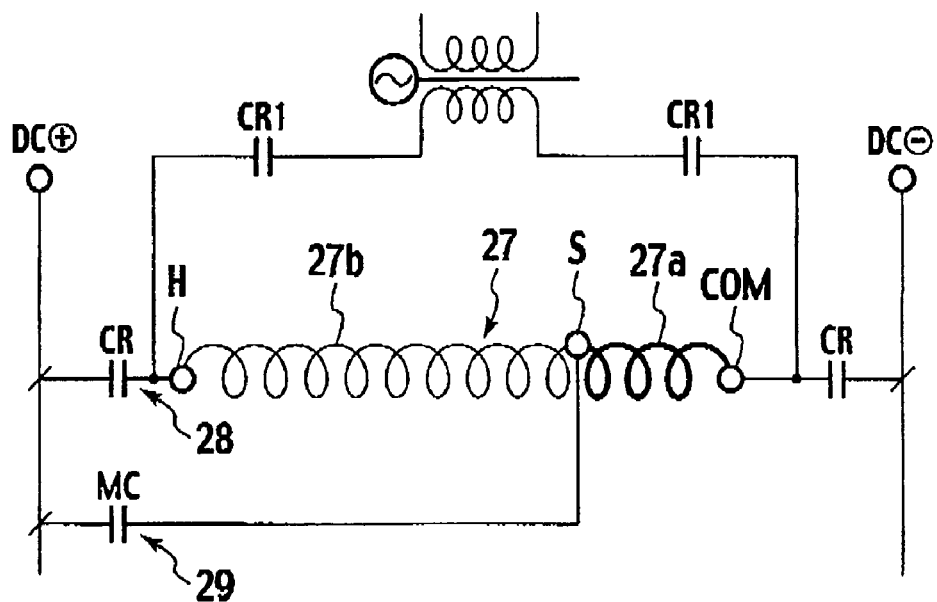
(b)
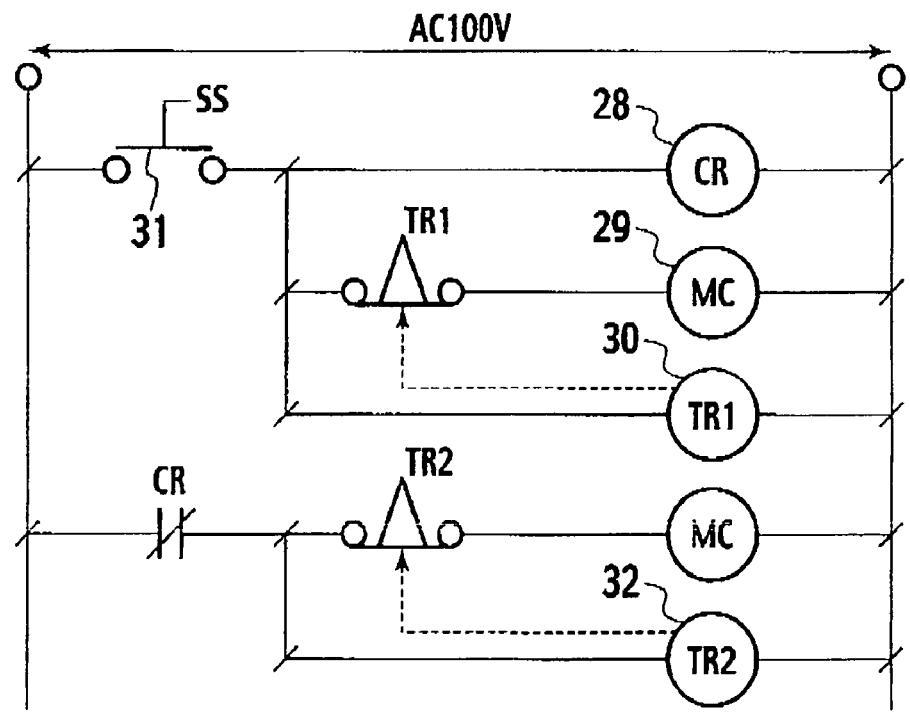

STEERING APPARATUS FOR VEHICLE

TECHNICAL FIELD

The present invention relates to a steering apparatus for a vehicle, which adopts a so-called steer-by-wire (SBW) system in which a steering wheel (steering device) and a steering mechanism are disconnected mechanically and road wheels are steered by driving the steering mechanism based on an electric signal converted from a steering amount of the steering wheel.

BACKGROUND ART

A conventional steering apparatus with a steer-by-wire (SBW) system is disclosed in Patent Document 1 listed below. As shown in FIG. 1, this steering apparatus 100 includes: a steering wheel 101 operated by a driver; a steering angle sensor 102 for detecting a steered amount of the steering wheel 101 as an electric signal; a steering mechanism 103 capable of changing a steer angle of road wheels; an SBW control unit 104 for controlling a steering motor 103a of the steering mechanism 103 based on the electric signal detected by the steering angle sensor 102; and an electromagnetic clutch 105 capable of mechanically connecting the steering wheel 101 and the steering mechanism 103.

As shown in FIG. 2, the electromagnetic clutch 105 includes: a first clutch plate 106 rotated in conjunction with steering force onto the steering wheel 101; a second clutch plate 107 connected to an input shaft of the steering mechanism 103 and opposed to the first clutch plate 106; an electromagnetic clutch unit 108 for generating electromagnetic force to urge the first clutch plate 106 in a disconnection direction; and a spring 109 for urging the first clutch plate 106 in a connection direction. Clutch grooves 106a and 107a are formed in a radial pattern on opposed surfaces of the first and second clutch plates 106 and 107, respectively.

In the above-described configuration, the SBW control unit 104 sets the electromagnetic clutch 105 in the disconnected state by energizing an electromagnetic coil 108a in normal time to disconnect a mechanical connection between the steering wheel 101 and the steering mechanism 103. Then, the SBW control unit 104 drives the steering mechanism 103 according to an electric variable detected by the steering angle sensor 102 to steer the road wheels (not shown) when the steering wheel 101 is steered.

When it is determined that the steering motor 103a or the like have failed, the SBW control unit 104 stops the energization to the electromagnetic coil 108a, and switches the electromagnetic clutch 105 from the disconnected state to the connected state and stops controlling the steering mechanism 103 based on the electric variable detected by the steering angle sensor 102. As a result, steering force onto the steering wheel 101 is conducted to the steering mechanism 103 through the electromagnetic clutch 105 and the road wheels (not shown) are steered by the steering mechanism 103.

As described above, in the conventional steering apparatus with the SBW system, it is possible to steer the road wheels by the electromagnetic clutch 105 when the system has failed. In addition, since the clutch grooves 106a and 107a are formed on the opposed surfaces of the first and second clutch plates 106 and 107, large torque can be transmitted. Patent Document 1: Japanese Patent Laid-Open Publication No. 2004-237785

DISCLOSURE OF THE INVENTION

However, in the above-described conventional vehicle steering apparatus 100, the second clutch plate 107 is not being rotated at switching the electromagnetic clutch 105 from the disconnected state to the connected state. Otherwise, since the first clutch plate 106 rotates in conjunction with an operation of the steering wheel 101, the first clutch plate 106 may be being rotated. Therefore, both of the clutch grooves 106a and 107a may not be intermeshed with each other immediately and then the electromagnetic clutch 105 cannot be set to the connected state immediately if a rotational difference relatively between the first and second clutch plates 106 and 107 exists. Here, the electromagnetic clutch 105 can be set to the connected state immediately if the clutch grooves 106a and 107a of the first and second clutch plates 106 and 107 are omitted. However, the electromagnetic clutch 105 cannot transmit a large torque therethrough in this case.

Consequently, it is an object of the present invention to provide a steering apparatus for a vehicle, which can set an electromagnetic clutch to a connected state immediately when it has been determined that a steer-by-wire mode cannot be executed properly and can transmit a large torque therethrough.

The present invention is a vehicle steering apparatus capable of steering road wheels by a steering mechanism mechanically disconnected with a steering device. The vehicle steering apparatus of the present invention comprises a clutch capable of mechanically connecting the steering device and the steering mechanism. The clutch includes: a shaft which is rotated by operating force onto the steering device and has a rotating protrusion rotated integrally; an internal gear ring which is rotatable around a center axis of the shaft as a rotation center, has internal teeth on an inner circumference, and is mechanically connected to the steering mechanism; an external gear ring which is rotatable around an axis, which is eccentrically located with respect to the center axis of the shaft, is disposed between the shaft and the internal gear ring, and has external teeth partially intermeshed with the internal teeth; lock members which are rotated by being pushed by the rotating protrusion while the shaft is rotated, and makes the external gear ring intermeshed with the internal teeth; and a lock operating member for moving the lock members to a lock position. The lock member is rotated by the rotating protrusion without wedging the lock members between the external gear ring and the shaft when the lock members are not located at the lock position by the lock operating member. The shaft, the lock members and the external gear ring are rotated integrally by wedging the lock members between the external gear ring and the shaft when the lock members are located at the lock position by the lock operating member.

According to the present invention, in a disconnected state of the clutch, since the shaft rotates in conjunction with an operation of the steering device and the external gear ring and the lock member slip each other, rotation force of the shaft is not transmitted to the internal gear ring. However, the lock operating member of the solenoid is moved to locate the lock members at the lock position, when steering operation of the road wheels by a steering actuator cannot be executed properly in conjunction with the operation of the steering device. Then, the shaft, the lock members and the external gear ring rotate integrally. Since the external gear ring is already intermeshed partially with the internal gear ring, the external gear ring and the internal gear ring rotate together after immediately being integrated with the shaft, and the operation force onto the steering wheel is transmitted to the steering mechanism via the clutch. As a result, the clutch can be set to the connected state immediately, when it has been determined that the steering operation of the road wheels by the steering actuator cannot be executed properly in conjunction with the operation of the steering device. In addition, a large torque can be transmitted by intermeshing the external teeth and the internal teeth.

Here, it is preferable that the lock operating member is provided on a rotation orbit of the lock members, the lock members are composed of a pair of lock pieces, the rotating protrusion thrusts either one of the pair of lock pieces toward the other of the pair of lock pieces to set the pair of lock pieces at an unlock position by being contacted each other, and the lock operating member is wedged between the pair of lock pieces and separate the pair of lock pieces each other to locate the pair of lock pieces at the lock position. According to this configuration, since the lock operating member is provided on the rotation orbit of the lock members (the pair of lock pieces), the shaft and the pair of lock pieces have no rotational difference relatively and rotate in the same phase, and the lock operating member can be wedged between the pair of lock pieces reliably. Therefore, the lock members can be moved to the lock position reliably.

Here, it is preferable that the vehicle steering apparatus further comprises an electromagnetic solenoid including an urging member which urges the lock operating member in a lock direction, and an electromagnet which moves the lock operating member to an unlock position by electromagnetic force generated by energizing an electromagnetic coil. According to this configuration, since the electromagnetic clutch is set to the connected state when the electric power is not supplied thereto, it is possible to steer the road wheels by the steering wheel even when the electric power is cut off.

Here it is preferable that the electromagnetic coil is composed of a coil of a thick wire (small-resistance coil) and a coil of a thin wire (large-resistance coil), and the coil of the thick wire (small-resistance coil) is energized at an early phase of an energization of the electromagnetic coil and the coil of the thin wire (large-resistance coil) is further energized after a predetermined time has elapsed from the energization. According to this configuration, since large electromagnetic force is applied to the lock operating member at the early phase of the energization of the electromagnetic coil, the lock operating member can be moved reliably. In addition, since small electromagnetic force is applied to the lock operating member after the lock operating member has been moved, the position of the lock operating member can be held by small electric power without overheating of the electromagnetic coil.

Here, it is preferable that the electromagnetic coil is energized with an opposite phase current after the energization of the electromagnetic coil has been ended. According to this configuration, since remnant magnetism is deleted immediately by the opposite phase current after the energization of the electromagnetic coil has been ended, the lock operating member can be moved immediately and reliably by the urging member.

Here, another of the present invention is a steering apparatus for a vehicle capable of steering road wheels by a steering mechanism mechanically disconnected with a steering device. The steering apparatus of the present invention comprises a clutch capable of mechanically connecting the steering device and the steering mechanism. The clutch includes an electromagnetic solenoid which performs connection/disconnection based on whether or not electromagnetic force is present. An electromagnetic coil of the electromagnetic solenoid is composed of a small-resistance coil and a large-resistance coil. Only the small-resistance coil is energized at an early phase of an energization of the electromagnetic coil, and the small-resistance coil and the large-resistance coil are energized after a predetermined time has elapsed from the energization.

According to the present invention, since large electromagnetic force is applied to the lock operating member at the early phase of the energization of the electromagnetic coil, the lock operating member can be moved reliably. In addition, since small electromagnetic force is applied to the lock operating member after the lock operating member has been moved, the position of the lock operating member can be held by small electric power without overheating of the electromagnetic coil.

Furthermore, yet another of the present invention is a steering apparatus for a vehicle capable of steering road wheels by a steering mechanism mechanically disconnected with a steering device. The vehicle steering apparatus of the present invention comprises a clutch capable of mechanically connecting the steering device and the steering mechanism. The clutch includes an electromagnetic solenoid which performs connection/disconnection based on whether or not electromagnetic force is present. The electromagnetic solenoid includes an electromagnet which disconnects the clutch by electromagnetic force generated by energizing an electromagnetic coil. The electromagnetic solenoid energizes the electromagnetic coil with an opposite phase current after the energization of the electromagnetic coil has been ended.

According to the present invention, since the electromagnetic clutch is set to the connected state when the electric power is not supplied thereto, it is possible to steer the road wheels by the steering wheel even when the electric power is cut off. In addition, since remnant magnetism is deleted immediately by the opposite phase current after the energization of the electromagnetic coil has been ended, the lock operating member can be moved to the lock position immediately and reliably by the urging member.

BRIEF DESCRIPTION OF THE DRAWINGS

FIG. 8 show the spool and the pair of lock pieces in a connected state, (a) is a front view thereof and (b) is a plan view thereof.

FIG. 10 show circuit diagrams of the electromagnetic coil, (a) shows the diagram on a drive side thereof and (b) shows the diagram on a control side thereof.

FIG. 12 show modified energizing circuit diagrams of the electromagnetic coil, (a) shows the diagram on a drive side thereof and (b) shows the diagram on a control side.

BEST MODE FOR CARRYING OUT THE INVENTION

A description will be made below of an embodiment of the present invention based on the drawings.

Figure 1:
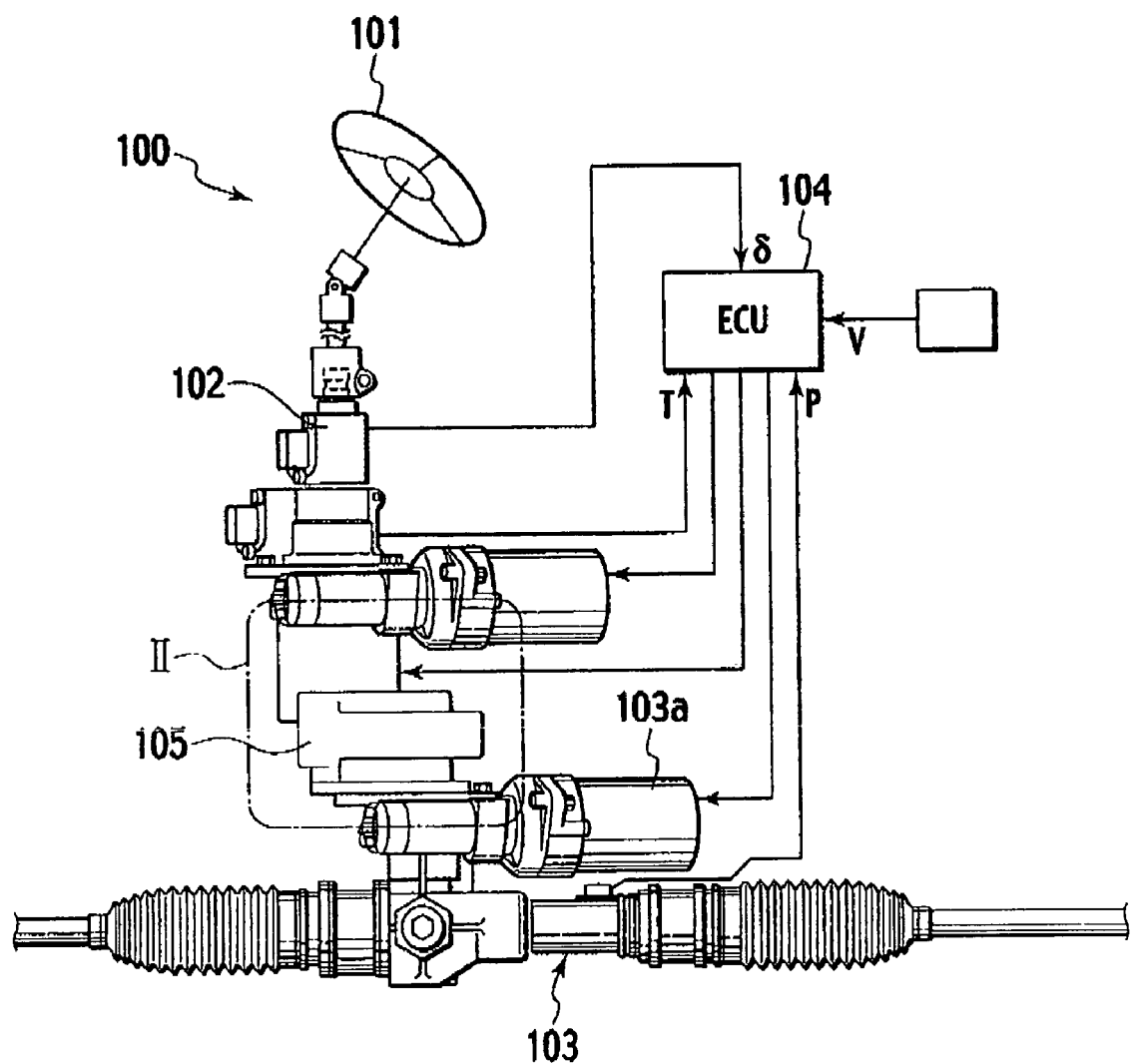
FIG. 1 is an overall schematic configuration view of a conventional steering apparatus for a vehicle.
Figure 2:
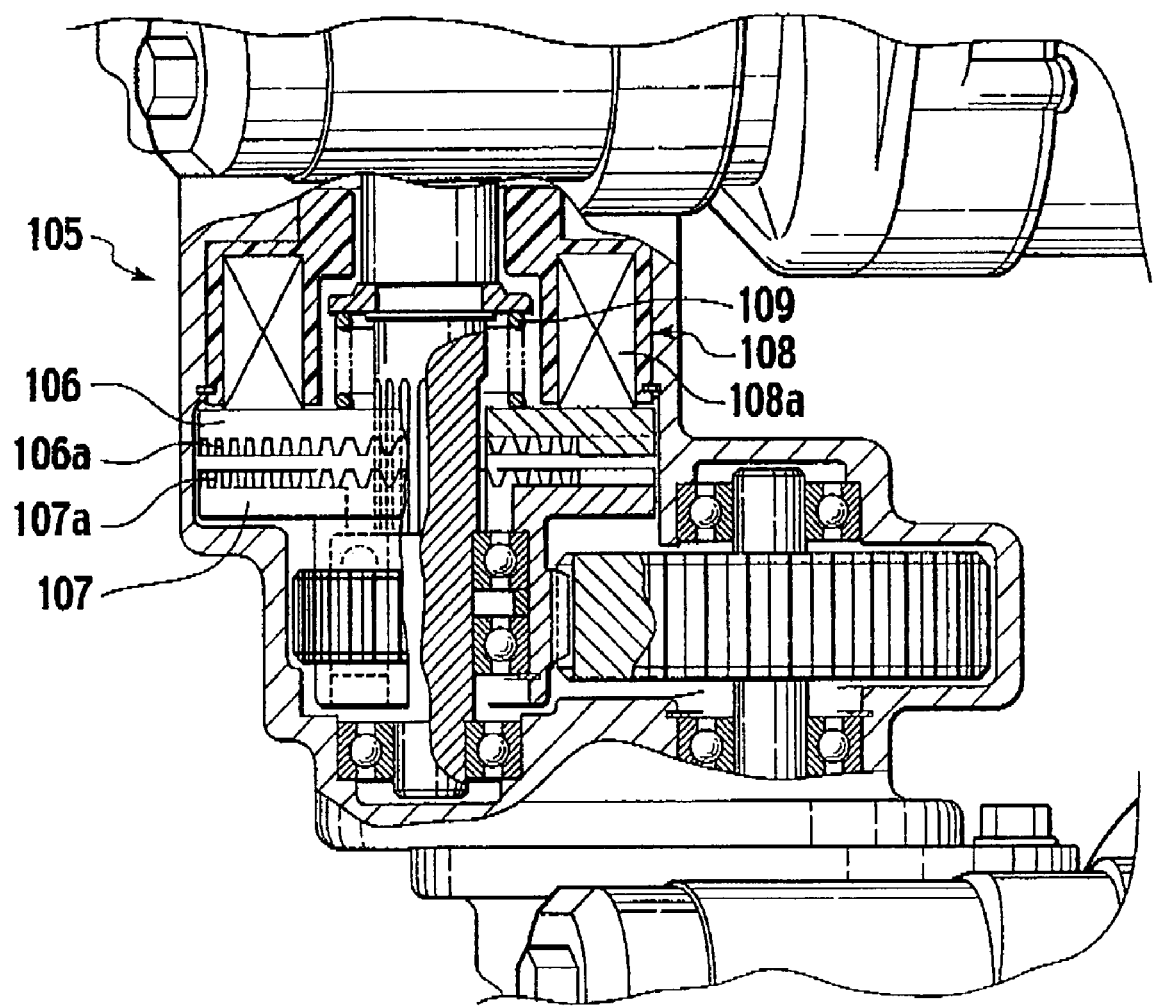
FIG. 2 is a detail view of a portion II in FIG. 1.
Figure 3:
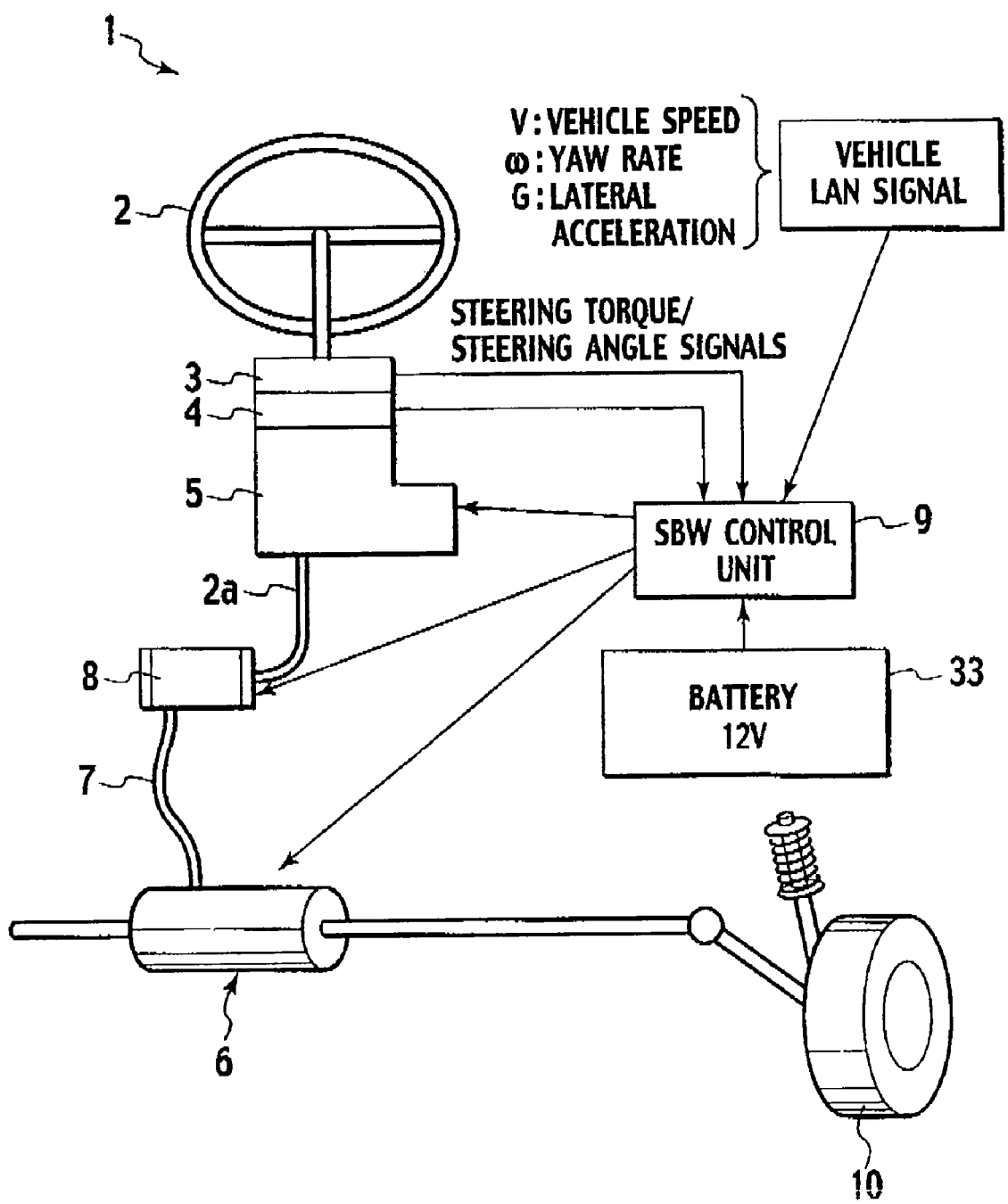
FIG. 3 is an overall schematic configuration diagram of an embodiment of a steering apparatus of the present invention.

As shown in FIG. 3, a steering apparatus for a vehicle 1 includes: [a] a steering wheel (steering device) 2 operated by a driver; [b] a steering angle sensor 3 for detecting an operating amount of the steering wheel 2 as an electric signal; [c] a torque sensor 4 for detecting torque of the steering wheel 2; [d] a steering reaction force generator 5 for generating reaction force to the steering wheel 2; [e] a steering mechanism 6 for changing a steering angle of road wheels 10; [f] an electromagnetic clutch 8 for connecting the steering wheel 2 and the steering mechanism 6 mechanically with a wire 7; [g] an SBW control unit 9 for receiving a vehicle speed (V) signal, a yaw rate (ω) signal, a lateral acceleration (G) signal or the like as an in-vehicle LAN signal as well as a torque signal and a steering angle signal mentioned above; and [h] a battery 33 for supplying electric power to the above-described components.

In a connected state of the electromagnetic clutch 8, the electromagnetic clutch 8 conducts the operating amount of the steering wheel 2 to the wire 7 and the steering mechanism 6 steers the road wheels 10 based on the operating amount mechanically inputted thereto.

During an SBW mode, the SBW control unit 9 controls the steering mechanism 6 based on the steering angle signal from the steering angle sensor 3 to steer the road wheels 10 by a steering actuator (not shown) provided in the steering mechanism 6 according to the operating amount of the steering wheel 2. In addition, the SBW control unit 9 controls the steering reaction force generator 5 based on the torque signal from the torque sensor 4 and so on to enable an operation of the steering wheels 2 with appropriate torque. Furthermore, the SBW control unit 9 switches the electromagnetic clutch 8 from the disconnected state to the connected state when the SBW control unit 9 has determined that the SBW mode cannot be executed properly due to a system malfunction of electrical equipment, an SBW system or the like.

Figure 4:
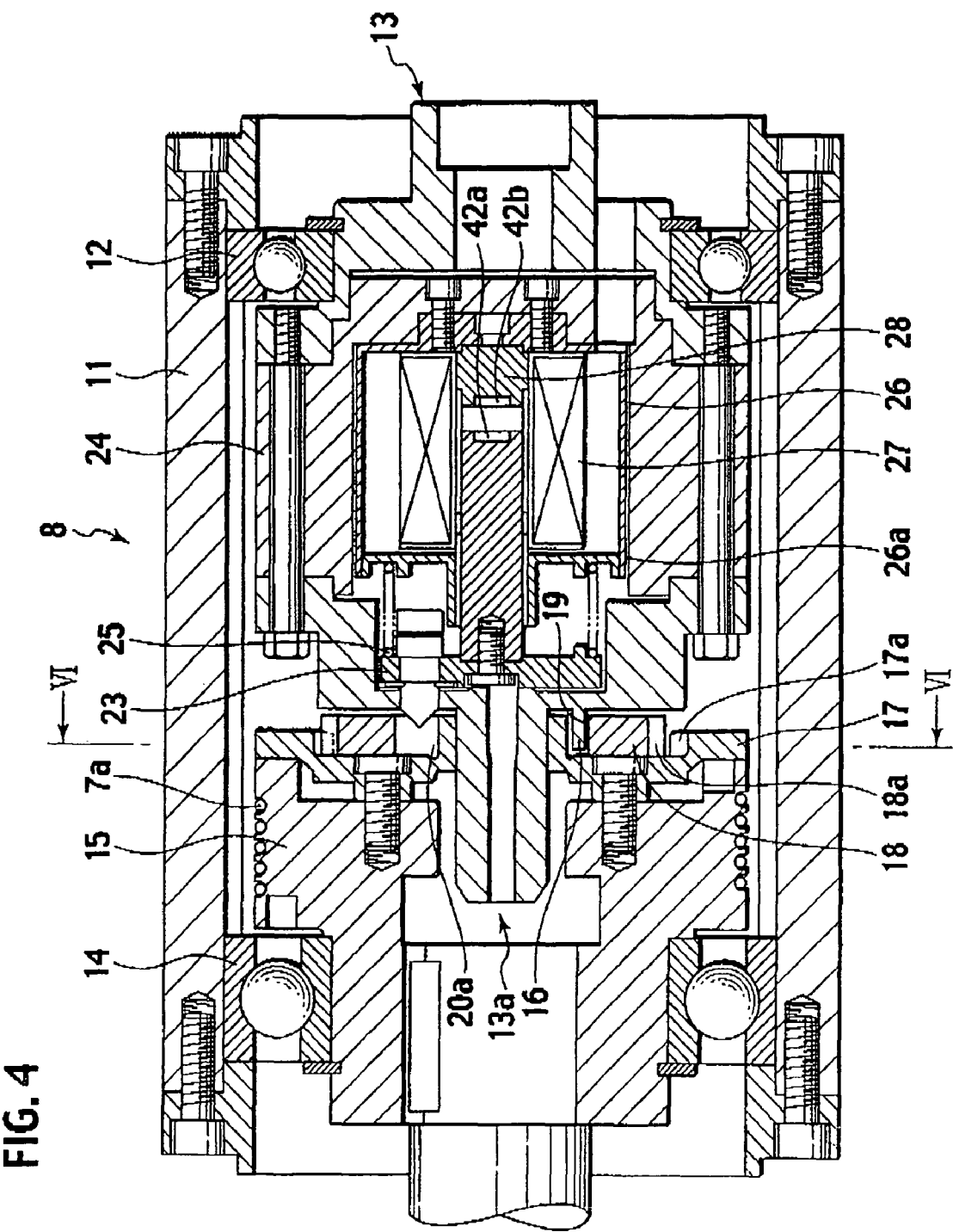
FIG. 4 is a cross-sectional view of a main portion of an electromagnetic clutch in the embodiment of the present invention.
Figure 5:
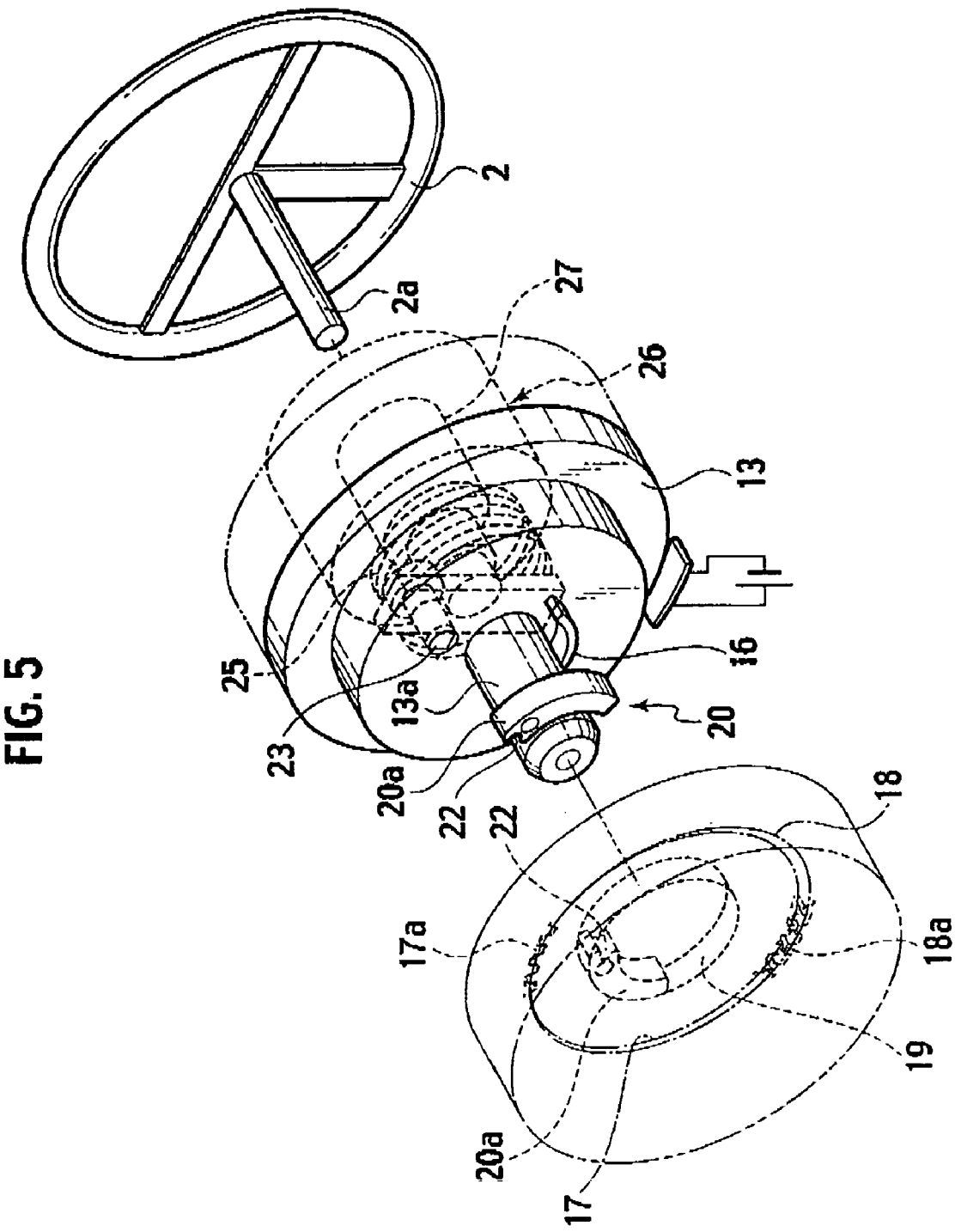
FIG. 5 is a schematic perspective view of the electromagnetic clutch in the embodiment of the present invention.

Next, a configuration of the electromagnetic clutch 8 will be described in detail. As shown in FIG. 4 and FIG. 5, the electromagnetic clutch 8 includes: a shaft 13 supported rotatably in a housing 11 via a bearing 12 interposed therebetween and connected with an output shaft 2a (shown in FIG. 3) on the steering wheel 2 side; and an output pulley 15 supported rotatably and coaxially with the shaft 13 in the housing 11 via a bearing 14 interposed therebetween. An inner wire 7a of the wire 7 connected to the steering mechanism 6 is wound around the output pulley 15 to transmit rotation of an aftermentioned internal gear ring 17 to the steering mechanism 6. A protrusion 13a is provided on one end of the shaft 13 and a circular-arc rotating protrusion 16 is provided around the protrusion 13a.

The internal gear ring 17 is fixed to the output pulley 15 with opposing to the shaft 13 and supported rotatably around a center axis of the shaft 13. Internal teeth 17a are provided on an inner circumference of the internal gear ring 17. An external gear ring 18 has a center hole 19 penetrated by the protrusion 13a of the shaft 13 and is disposed between the shaft 13 and the internal teeth 17a of the internal gear ring 17. External teeth 18a are provided on an outer circumferential surface of the external gear ring 18. The center hole 19 is formed to be larger than an outer diameter of the protrusion 13a of the shaft 13. The external gear ring 18 is eccentrically located with respect to the internal gear ring 17 so that the external teeth 18a can be intermeshed with the internal teeth 17a.

Figure 6:
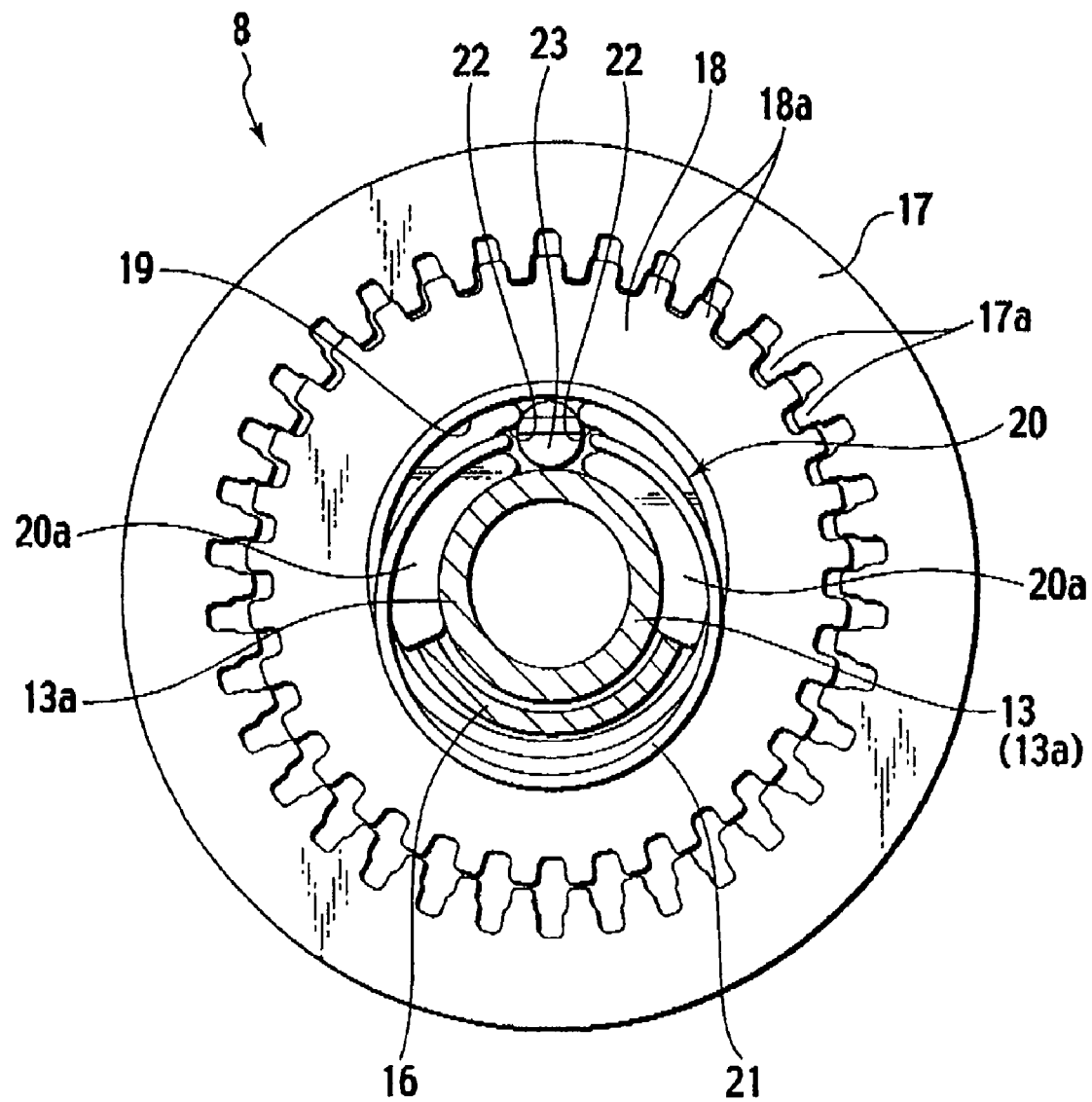
FIG. 6 is a cross-sectional view along a line VI-VI in FIG. 4 in the embodiment of the present invention, where a pair of lock pieces is located at a lock position.
Figure 7:
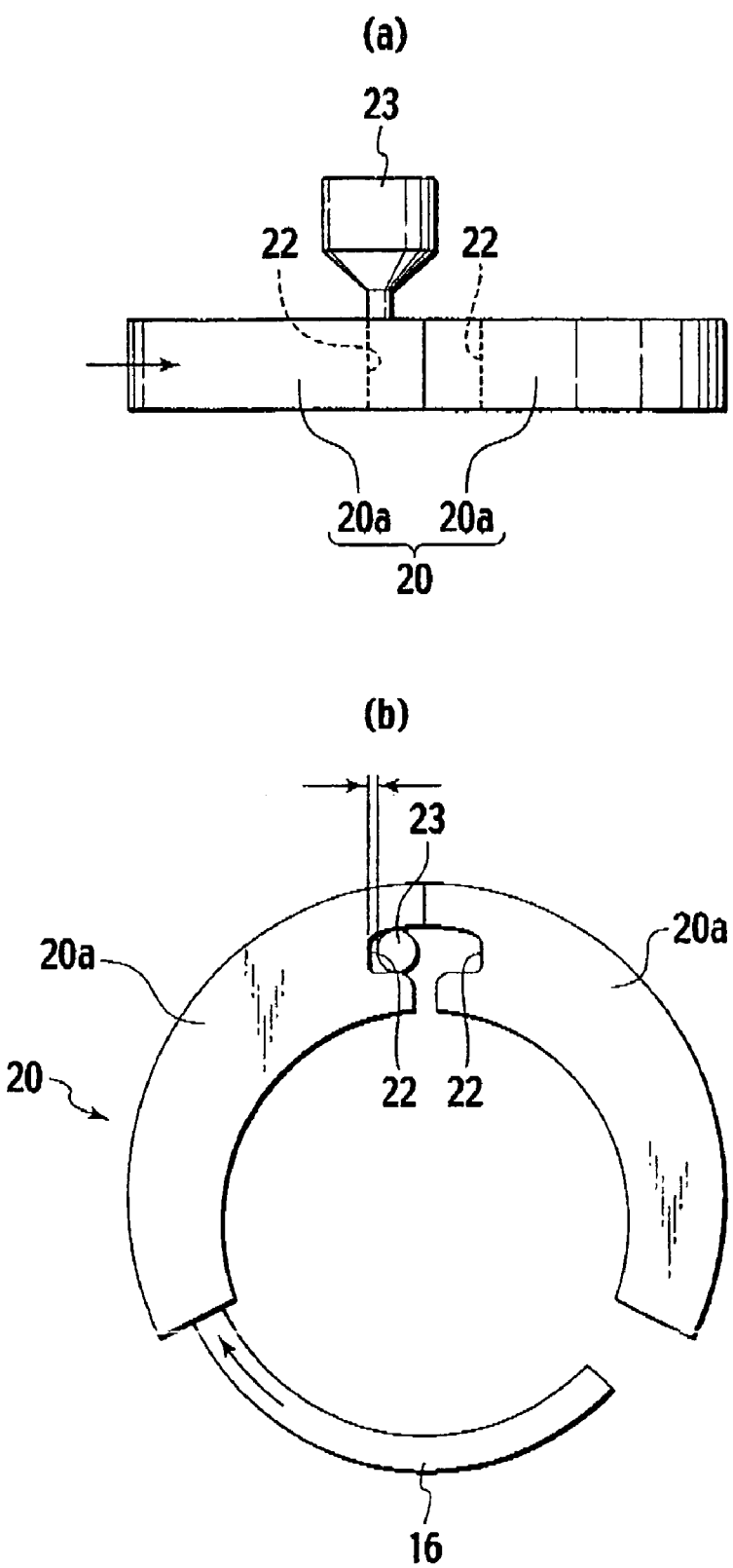
FIG. 7 show a spool and the pair of lock pieces in a disconnected state, (a) is a front view thereof and (b) is a plan view thereof.

As shown in detail in FIG. 6, FIG. 7(a) and FIG. 7(b), lock members 20 are disposed within a space between the outer circumference of the shaft 13 and the external gear ring 18, and eccentrically-located to make the external teeth 18a of the external gear ring 18 intermeshed with the internal teeth 17a. The lock members 20 are composed of a pair of lock pieces 20a and one end of each of the lock pieces 20a extends close to the rotating protrusion 16. As shown in FIG. 7(a) and FIG. 7(b), it is an unlock position that a spool (lock operating member) 23 is not wedged between the pair of lock pieces 20a and the pair of lock pieces 20a is contacted each other. Otherwise, as shown in FIG. 8(a) and FIG. 8(b), it is a lock position that the spool 23 is projected between the pair of lock pieces 20a and the pair of lock pieces 20a is separated each other.

At the unlock position, since each of the lock pieces 20a is not wedged between the external gear ring 18 and the protrusion 13a, the pair of lock pieces 20a are rotated by being pushed by the rotating protrusion 16 in sliding contact with the external gear ring 18 when the shaft 13 rotates. In this case, the external gear ring 18 is rotated with intermeshed with the internal gear ring 17 by the pair of lock pieces 20a. At the lock position, each of the lock pieces 20a is wedged between the external gear ring 18 and the protrusion 13a. Furthermore, since the external teeth 18a are intermeshed with the internal teeth 17a, the pair of lock pieces 20a restrains the external gear ring 18 from moving in a radial direction to make the distance between the outer circumference of the protrusion 13a of the shaft 13 and the external teeth 18a of the external gear ring 18 constant. As a result, the pair of lock pieces 20a and the external gear ring 18 rotate integrally to rotate the output pulley 15 via the internal gear ring 17 by intermeshing of the gear rings when the shaft 13 rotates.

Note that, a ring spring 21 is provided between the pair of lock pieces 20a. The pair of lock pieces 20a are urged to the lock position to be spaced away each other by spring force of the ring spring 21. However, the spring force is so small that one of the lock pieces 20a can be moved to the unlock position by pressing force from the release protrusion 16. Specifically, the ring spring 21 only prevents the pair of lock pieces 20a from rattling. In addition, guide grooves 22 are formed on opposed end faces of the pair of lock pieces 20a, respectively.

As shown in FIG. 6, FIG. 7(a), FIG. 7(b), FIG. 8(a) and FIG. 8(b), a tip end of the spool (lock operating member) 23 is provided on the shaft 13 and is disposed on a rotation orbit of the pair of lock pieces 20a and within a pair of guide grooves 22. Since the shaft 13 and the pair of lock pieces 20a are always synchronized to rotate each other, a relative position between the spool 23 and the pair of lock pieces 20a is not changed. In addition, the spool 23 is provided to be able to projected-into and retracted-from a space between the pair of lock pieces 20a due to fluctuation of electromagnetic force by an electromagnetic solenoid 24. The tip end of the spool 23 is tapered off to a point and able to projected into the pair of guide grooves 22 smoothly and surely.

Figure 9:
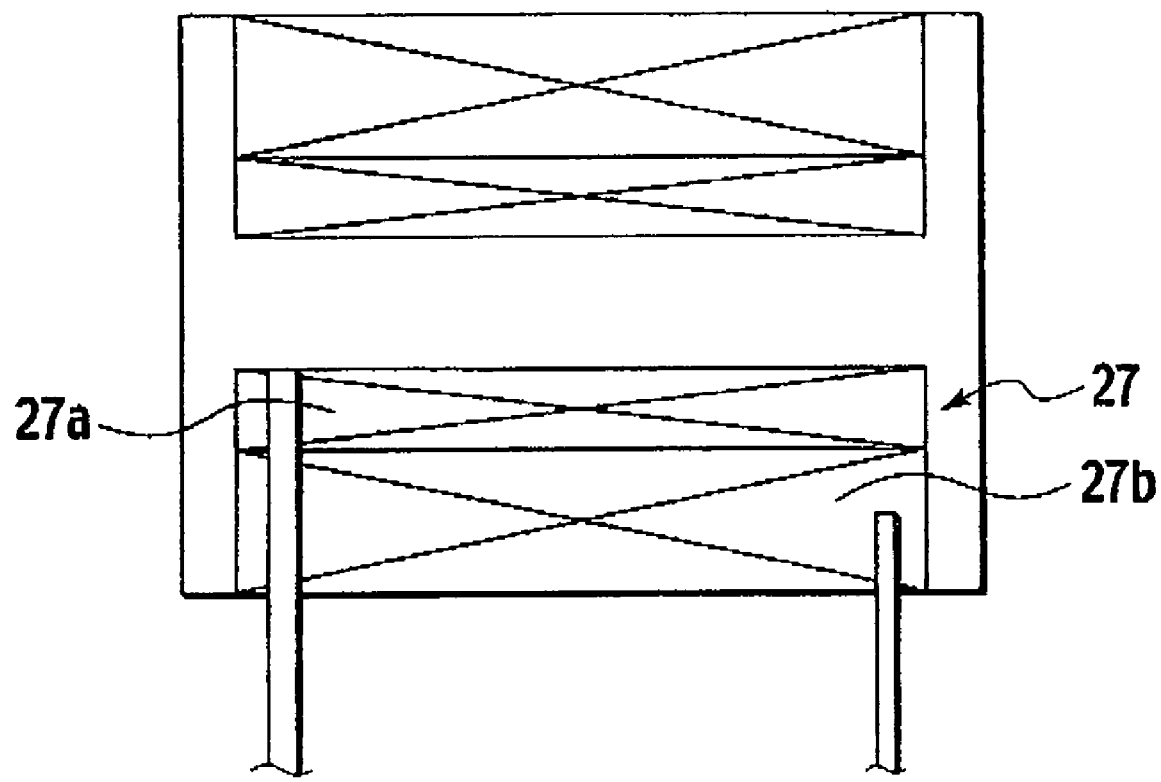
FIG. 9 is a configuration view of an electromagnetic coil in the embodiment of the present invention.

The electromagnetic solenoid 24 has a spring 25 for urging the spool 23 to the lock position and an electromagnet 26 for projecting the spool 23 to the unlock position by the electromagnetic force. As shown in FIG. 9, the electromagnetic coil 27 of the electromagnet 26 is composed of a (small-resistance) coil 27a of a thick wire and a (large-resistance) coil 27b of a thin wire sequentially connected to the coil 27a. As shown in FIG. 10(a) and FIG. 10(b), an energizing circuit of the electromagnetic coil 27 is composed so that, only the coil 27a of a thick wire is energized when a first relay 28 and a second relay 29 are closed and both of the coil 27a of a thick wire and the coil 27b of a thin wire are energized when the second relay 29 turns to be opened by a first timer 30.

Figure 11:
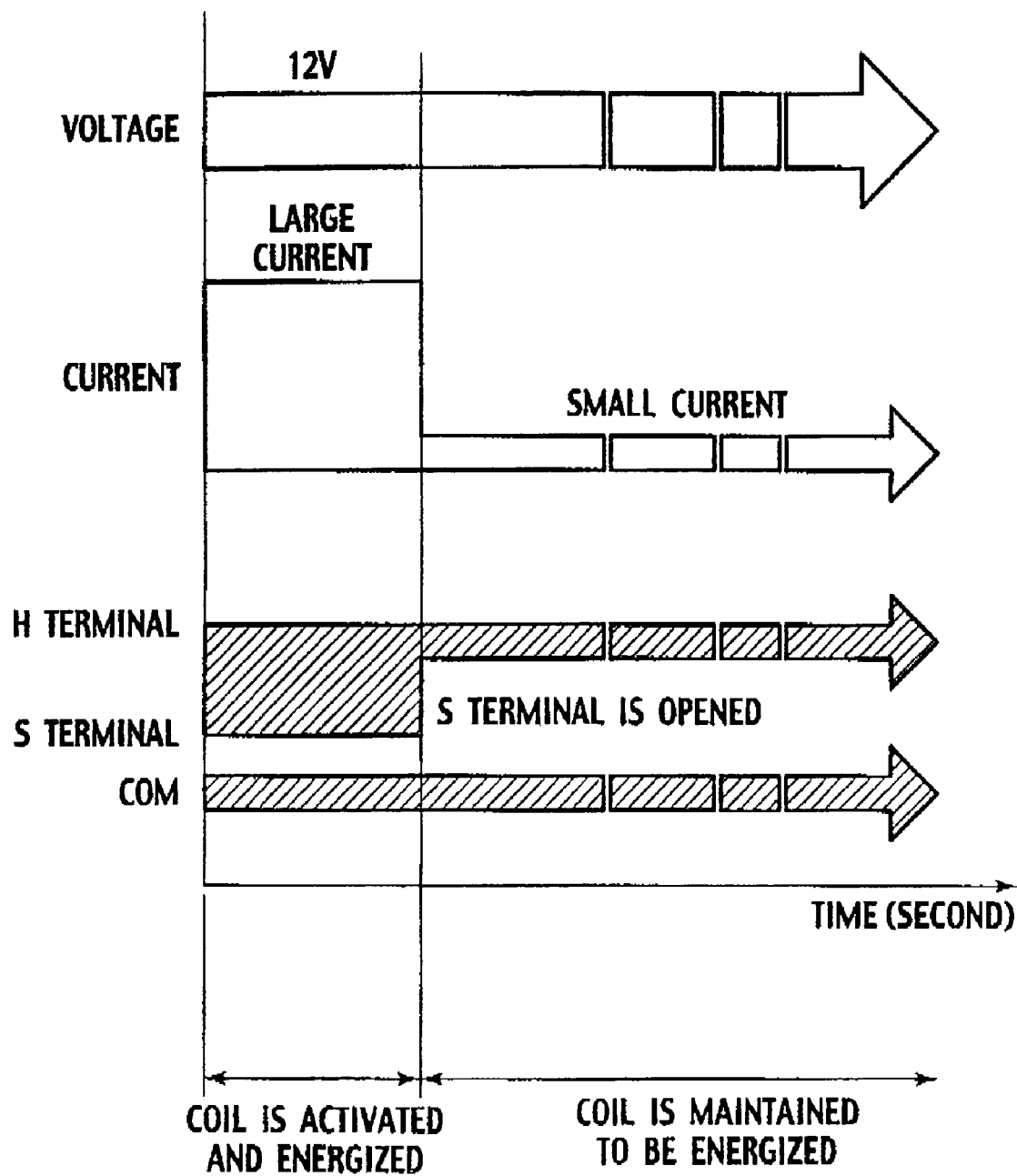
FIG. 11 is a diagram showing output states of the respective portions and so on in the embodiment of the present invention.

The first timer 30 opens the second relay 29 when a predetermined time has elapsed from closing of a start switch 31. Therefore, as shown in FIG. 11, the electromagnetic coil 27 is energized with a large current during the predetermined time from an activation of the electromagnetic clutch 8 and then energized with a small current after the predetermined time has elapsed. Note that, regulating means of the current through the electromagnetic coil 27 is not limited to a timer. The current may be regulated based on an entering amount of the tip end of the spool 23 between the lock pieces 20a, tension of the wire 7, axial torque of the output pulley 15 and so on.

Next, functions of the above-described steering apparatus 1 will be described. In normal state, the SBW control unit 9 selects the SBW mode and sets the electromagnetic clutch 8 in the disconnected state by energizing the electromagnetic coil 27 to disconnect a mechanical connection between the steering wheel 2 and the steering mechanism 6. Then, the SBW control unit 9 drives the steering mechanism 6 according to an electric variable detected by the steering angle sensor 3 to steer the road wheels 10 when the steering wheel 2 is steered.

If it has been determined that the SBW mode cannot be executed properly due to a malfunction in the SBW system or an electronic component system, the SBW control unit 9 stops energizing the electromagnetic coil 27 to switch the electromagnetic clutch 8 from the disconnected state to the connected state and to stop controlling the steering mechanism 6 based on the electric variable detected by the steering angle sensor 3. As a result, steering force onto the steering wheel 2 is conducted to the steering mechanism 6 through the electromagnetic clutch 8 after the electromagnetic clutch 8 has been switched from the disconnected state to the connected state and the road wheels 10 are steered by the steering mechanism 6.

Next, functions of switching the electromagnetic clutch 8 from the disconnected state to the connected state will be described in detail. In the disconnected state of the electromagnetic clutch 8 shown in FIG. 7(a) and FIG. 7(b), the spool 23 is retracted to the unlock position by an electromagnetic force by the energization of the electromagnetic coil 27. The pair of lock pieces 20a rotates together with contacted each other by the rotating protrusion 16 when the shaft 13 is rotated (the spring force of the ring spring 21 is so small that the pair of lock pieces 20a is easily contacted each other by the rotating protrusion 16). The external gear ring 18 rotates with displacing its meshing position with the internal gear ring 17 by the pair of lock pieces 20a rotating together with the shaft 13. At this time, the pair of lock pieces 20a and the external gear ring 18 slip each other.

Otherwise, as shown in FIG. 6, FIG. 8(a) and FIG. 8(b), the spool 23 is projected by a spring force of the spring 25 to wedge the pair of lock pieces 20a into the lock position between the external gear ring 18 and the protrusion 13a when the energization of the electromagnetic coil 27 is stopped to set the electromagnetic clutch 8 to the connected state. And then, the external gear ring 18 and the shaft 13 rotate integrally. At this time, since the external gear ring 18 and the internal gear ring 17 are already intermeshed each other, each of the external gear ring 18 and the internal gear ring 17 rotate immediately together with the rotation of the shaft 13. As a result, the steering force onto the steering wheel 2 is conducted to the steering mechanism 6 via the electromagnetic clutch 8 and the wire 7.

According to the above-mentioned configuration, if it has been determined that the SBW mode cannot be executed properly, the SBW control unit 9 set the electromagnetic clutch 8 to the connected state immediately. In addition, the large torque can be transmitted by intermeshing the external teeth 18a and the internal teeth 17a.

In the present embodiment, the spool 23 is provided on a rotation orbit of the lock members 20, and the lock members 20 are composed of the pair of lock pieces 20a. The rotating protrusion 16 thrusts one lock piece 20a toward another lock piece 20a to set the pair of lock pieces 20a to an unlocked state by being contacted each other. The pair of lock pieces 20a is wedged between the protrusion 13a and the external gear ring 18 to be set in a locked state when the spool 23 is projected between the pair of lock pieces 20a to separate them each other. Note that, since the shaft 13 and the pair of lock pieces 20a have no rotational difference relatively and rotate in the same phase, the spool 23 can be wedged between the pair of lock pieces 20a reliably. Therefore, the lock members 20 can be locked reliably. Note that, since the pair of lock pieces 20a function as wedges, entering force of the spool 23 between the pair of lock pieces 20a is small.

In the present embodiment, the electromagnetic solenoid 24 is composed by the spring 25 for urging the spool 23 in the lock direction and the electromagnet 26 which generates the electromagnetic force by energizing the electromagnetic coil 27 to retract the spool 23 at the unlock position. Therefore, since the electromagnetic clutch 8 is set in the connected state when being non-energized, the road wheels 10 can be steered by the steering wheel even when the electric power is switched off.

In addition, in the present embodiment, the electromagnetic coil 27 is composed of the (small-resistance) coil 27a of the thick wire and the (large-resistance) coil 27b of the thin wire to energize the coil 27a of the thick wire at an early phase of its energization and then to energize also the coil 27b of the thin wire after the predetermined time has elapsed from its energization. Therefore, the spool 23 can be moved reliably by the large electromagnetic force at the early phase after its energization and the position of the spool 23 can be held by small electric power without overheating of the electromagnetic coil 27 after the spool 23 has been moved by small electromagnetic power.

FIG. 12(a) and FIG. 12(b) show a modified embodiment of the energizing circuit of the electromagnetic coil. FIG. 12(a) shows a circuit diagram on a drive side of the energizing circuit of the electromagnetic coil 27 and FIG. 12(b) shows a circuit diagram on a control side of the energizing circuit of the electromagnetic coil 27. As shown in FIG. 12(a) and FIG. 12(b), the electromagnetic coil 27 turns to be energized with an opposite phase current after the start switch 31 has been opened to stop the energization of the electromagnetic coil 27 and then the current is cut off after a fixed time has elapsed by a second timer 32. In this modified embodiment, the electromagnetic coil 27 is energized by the opposite phase current after its energization has been ended. Therefore, remnant magnetism in the spool 23 is deleted immediately by the opposite current after the energization of the electromagnetic coil 27 has been ended to be able to move the spool 23 immediately and reliably by the spring force of the spring 25.

Figure 13:
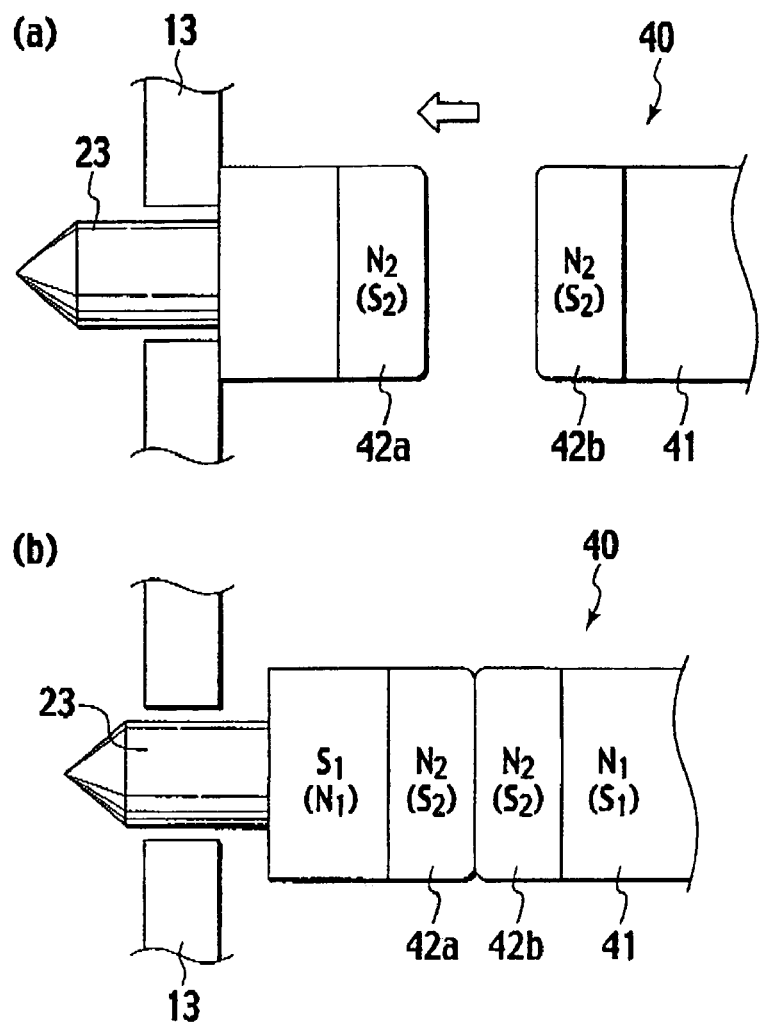
FIG. 13 show a first modified embodiment of an electromagnetic solenoid mechanism, (a) shows the electromagnetic coil in a non-energized state and the spool at a projected position, and (b) shows the electromagnetic coil in an energized state and the spool at a retracted position.

FIG. 13(*a*) and FIG. 13(*b*) show a first modified embodiment of the electromagnetic solenoid. FIG. 13(*a*) shows that the electromagnetic coil 27 is non-energized to locate the spool 23 at the locked position and FIG. 13(*b*) shows that the electromagnetic coil is energized to locate the spool 23 at the unlocked position. The electromagnetic solenoid 40 includes a solenoid rod 41 provided separately from the spool (lock operating member) 23, homopolar permanent magnets 42*a* and 42*b* provided on each end portion of the spool 23 and the solenoid rod 41, and the electromagnet 26 for moving the spool 23 in an unlock direction by the electromagnetic force generated by energizing the electromagnetic coil 27. Specifically, magnetic force (repelling force) of the permanent magnets 42*a* and 42*b* is utilized to move the spool 23 to the locked direction, in place of (in addition to) the spring force of the spring 25 of the above-described embodiment. Note that, a configuration using pulling force by changing arrangement of the permanent magnets can be realized.

Figure 14:
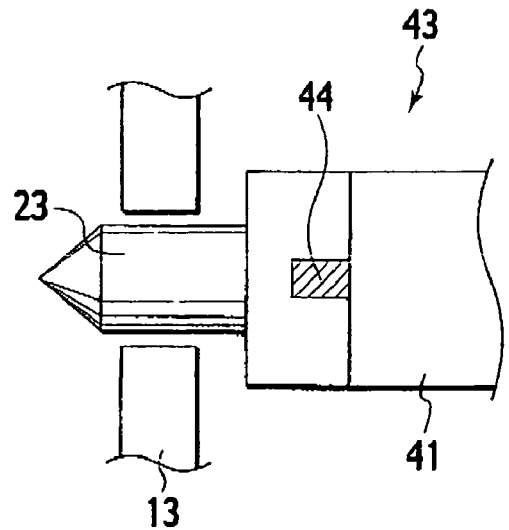
FIG. 14 shows a second modified embodiment of the electromagnetic solenoid mechanism, where the electromagnetic coil in an energized state and the spool at a retracted position.

FIG. 14 shows a second modified embodiment of the electromagnetic solenoid. FIG. 14 shows that the electromagnetic coil 27 is energized to locate the spool at the unlock position. The electromagnetic solenoid mechanism 43 includes a solenoid rod 41 separably connected with the spool (lock operating member) 23, an explosive 44 for moving the spool 23 to the lock position by separating the spool 23 from the solenoid rod 41, and the electromagnet 26 for moving the spool 23 in an unlock direction by the electromagnetic force generated by energizing the electromagnetic coil 27. Specifically, the electromagnetic solenoid in the second modified embodiment uses explosive force of the explosive 44 to move the spool 23 to a lock direction, in place of (in addition to) the spring force of the spring 25 of the above-described embodiment.

Note that, in the above-described embodiments, the electromagnetic clutch 8 is set in the disconnected state while the electromagnetic coil 27 is energized and in the connected state while the electromagnetic coil 27 is not energized. However, a configuration may be adopted so that the electromagnetic clutch 8 can be set in the connected state while the electromagnetic coil 27 is energized and in the disconnected state while the electromagnetic coil 27 is not energized.

INDUSTRIAL APPLICABILITY

According to the steering apparatus of the present invention, an electromagnetic clutch can be set in a connected state immediately when it has been determined that a steer-by-wire mode cannot be executed properly and, in addition, a large torque can be transmitted.

The invention claimed is:

1. A steering apparatus for a vehicle capable of steering road wheels by a steering mechanism mechanically disconnected with a steering device, the apparatus comprising a clutch capable of mechanically connecting the steering device and the steering mechanism, wherein the clutch includes:
   a shaft which is rotated by operating force onto the steering device and has a rotating protrusion rotated integrally therewith;
   an internal gear ring which is rotatable around a center axis of the shaft as a rotation center, has internal teeth on an inner circumference, and is mechanically connected to the steering mechanism;
   an external gear ring which is rotatable around an axis and eccentrically located with respect to the center axis of the shaft, is disposed between the shaft and the internal gear ring, and has external teeth partially intermeshed with the internal teeth on a constant basis;
   lock members which are disposed between the shaft and the external gear ring and are rotated by being pushed by the rotating protrusion while the shaft is rotated, and makes the external gear ring intermeshed with the internal teeth on a constant basis; and
   a lock operating member which is rotated in synchronization with the lock members and is capable of moving the lock members between a lock position and an unlock position,
   wherein the lock members are rotated by the rotating protrusion without wedging the lock members between the external gear ring and the shaft when the lock members are located at the unlock position by the lock operating member and thereby the external gear ring and the internal gear ring rotate partially intermeshed with each other and independently of rotation of the shaft, and
   wherein the shaft, the lock members and the external gear ring are rotated integrally by wedging the lock members between the external gear ring and the shaft when the lock members are located at the lock position by the lock operating member and thereby the external gear ring is rotated by the internal gear ring being partially intermeshed therewith due to rotation of the shaft.

2. The steering apparatus according to claim 1, wherein the lock operating member is provided on a rotational path of the lock members, the lock members being composed of a pair of lock pieces,
   the rotating protrusion thrusts either one of the pair of lock pieces toward the other of the pair of lock pieces to set the pair of lock pieces at the unlock position by contacting with each other, and
   the lock operating member is wedged between the pair of lock pieces to set the pair of lock pieces at the lock position that is separated from each other.

3. The steering apparatus according to claim 1, further comprising:
   an electromagnetic solenoid including an urging member which urges the lock operating member to set the lock members at the lock position, and
   an electromagnet which moves the lock operating member to reset the lock members to the unlock position by electromagnetic force generated by energizing an electromagnetic coil.

4. The steering apparatus according to claim 3, wherein the electromagnetic coil is composed of a coil of a first wire and a coil of a second wire, a diameter of the first wire being larger than a diameter of the second wire, and
   the coil of the first wire is energized at an initial stage of an energization of the electromagnetic coil and the coil of the second wire is further energized after a predetermined time has elapsed from a start of the energization.

5. The steering apparatus according to claim 3, wherein the electromagnetic coil is composed by sequentially connecting a first coil and a second coil, a resistance of the first coil being smaller than a resistance of the second coil, and
   only the first coil is energized at an initial stage of an energization of the electromagnetic coil and the first coil and the second coil are energized after a predetermined time has elapsed from a start of the energization.

6. The steering apparatus according to claim 3, wherein the electromagnetic coil is de-energized with an opposite phase current whose phase is opposite to that of a phase of a current for energization of the electromagnetic coil, after energization has ended.

* * * * *